United States Patent
Padmanabhan et al.

(10) Patent No.: US 10,430,033 B2
(45) Date of Patent: *Oct. 1, 2019

(54) DATA TRANSFER TARGET APPLICATIONS THROUGH CONTENT ANALYSIS

(71) Applicant: International Business Machines Corporation, Armonk, NY (US)

(72) Inventors: Girish Padmanabhan, Maharashtra (IN); Sunanda Patil, Maharashtra (IN); Hina Purohit, Pune (IN)

(73) Assignee: International Business Machines Corporation, Armonk, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 15/996,659

(22) Filed: Jun. 4, 2018

(65) Prior Publication Data

US 2018/0275842 A1    Sep. 27, 2018

Related U.S. Application Data

(63) Continuation of application No. 14/837,150, filed on Aug. 27, 2015, now Pat. No. 10,013,146.

(51) Int. Cl.
*G06F 3/0482* (2013.01)
*G06F 3/0486* (2013.01)
(Continued)

(52) U.S. Cl.
CPC .......... *G06F 3/0482* (2013.01); *G06F 3/0486* (2013.01); *G06F 3/04817* (2013.01);
(Continued)

(58) Field of Classification Search
None
See application file for complete search history.

(56) References Cited

U.S. PATENT DOCUMENTS 7,376,696 B2 * 5/2008 Bell ................... G06F 3/0486
709/203
7,631,268 B2 * 12/2009 McGowan .............. G06F 17/24
715/769

(Continued)

FOREIGN PATENT DOCUMENTS

CN    103064584 A    4/2013
WO    2012171645 A1   12/2012

OTHER PUBLICATIONS

Padmanabhan et al., "Data Transfer Target Applications Through Content Analysis", U.S. Appl. No. 15/996,767, filed Jun. 4, 2018, 36 pages.

(Continued)

*Primary Examiner* — Phenuel S Salomon
(74) *Attorney, Agent, or Firm* — Christopher K. McLane (57) ABSTRACT

In an approach for displaying applications associated with content in a clipboard, a computer receives a selection of content to transfer to a clipboard, wherein the content is selected from a first application on a computing device. The computer identifies one or more applications on one or more computing devices capable of processing the received selection. The computer assigns the identified one or more applications to one or more categories. The computer displays one or more user interface objects representative of the one or more applications with a respective assigned category.

16 Claims, 5 Drawing Sheets

(51) Int. Cl.
   *G06F 3/0481* (2013.01)
   *G06F 3/0484* (2013.01)
   *H04L 29/08* (2006.01)
   *H04L 29/06* (2006.01)

(52) U.S. Cl.
   CPC .......... *G06F 3/04842* (2013.01); *H04L 67/06* (2013.01); *H04L 67/10* (2013.01); *H04L 67/125* (2013.01); *H04L 67/42* (2013.01)

(56) References Cited

U.S. PATENT DOCUMENTS

| | | | | |
|---|---|---|---|---|
| 8,042,057 B2* | 10/2011 | Cossey | G06F 9/543 | 715/724 |
| 8,296,671 B2* | 10/2012 | Narayanan | G06F 9/543 | 715/764 |
| 8,386,509 B1* | 2/2013 | Scofield | G06F 17/30867 | 707/706 |
| 8,396,890 B2* | 3/2013 | Lim | G06F 17/3089 | 707/781 |
| 8,612,470 B1* | 12/2013 | Fushman | G06F 17/30867 | 707/767 |
| 8,655,886 B1* | 2/2014 | Gross | G06F 17/30613 | 707/705 |
| 8,682,918 B2* | 3/2014 | Ramanujam | G06F 17/30867 | 707/737 |
| 8,793,605 B2* | 7/2014 | Szeto | G06F 3/0486 | 715/764 |
| 9,654,447 B2* | 5/2017 | Brock | G06F 21/10 | |
| 2003/0152407 A1* | 8/2003 | Hatano | G03G 21/0005 | 399/350 |
| 2003/0154207 A1* | 8/2003 | Naito | G06Q 10/10 | |
| 2004/0225653 A1* | 11/2004 | Nelken | G06F 17/30286 | |
| 2005/0172241 A1* | 8/2005 | Daniels | G06F 3/0482 | 715/770 |
| 2005/0210401 A1* | 9/2005 | Ketola | G06F 9/543 | 715/770 |
| 2006/0143093 A1* | 6/2006 | Brandt | G06F 3/0482 | 705/26.1 |
| 2007/0035513 A1* | 2/2007 | Sherrard | G06F 3/04817 | 345/157 |
| 2007/0192713 A1* | 8/2007 | Lee | G06F 3/0236 | 715/764 |
| 2007/0192737 A1* | 8/2007 | Lee | G06F 3/0482 | 715/810 |
| 2007/0192742 A1* | 8/2007 | Lee | G06F 3/0482 | 715/828 |
| 2007/0250531 A1 | 10/2007 | Wiggins | | |
| 2007/0250633 A1* | 10/2007 | Norby | H04M 3/42229 | 709/227 |
| 2008/0005736 A1* | 1/2008 | Apacible | G06F 9/4843 | 718/100 |
| 2008/0083003 A1 | 4/2008 | Biniak | | |
| 2008/0163121 A1* | 7/2008 | Lee | G06F 3/0482 | 715/845 |
| 2008/0209339 A1 | 8/2008 | MacAdaan | | |
| 2009/0319491 A1* | 12/2009 | Akao | G06Q 30/02 | |
| 2010/0094822 A1* | 4/2010 | Kelapure | G06F 17/30091 | 707/705 |
| 2010/0115421 A1* | 5/2010 | Bejjani | G06F 15/16 | 715/751 |
| 2011/0047506 A1* | 2/2011 | Miller | G06F 17/24 | 715/808 |
| 2011/0125970 A1* | 5/2011 | Commarford | G06F 9/543 | 711/126 |
| 2011/0126092 A1* | 5/2011 | Harris | G06F 17/243 | 715/256 |
| 2011/0138314 A1* | 6/2011 | Mir | G06F 3/0484 | 715/779 |
| 2012/0060021 A1* | 3/2012 | Leblanc | G06F 9/4406 | 713/2 |
| 2012/0078838 A1* | 3/2012 | Kaufman | G06N 7/005 | 706/52 |
| 2012/0303684 A1* | 11/2012 | Sakurai | G06F 17/2288 | 707/827 |
| 2012/0311501 A1 | 12/2012 | Nonez | | |
| 2013/0019173 A1* | 1/2013 | Kotler | G06F 3/0482 | 715/711 |
| 2013/0054791 A1* | 2/2013 | Oki | G06F 11/3409 | 709/224 |
| 2013/0283274 A1* | 10/2013 | Mimran | G06F 9/46 | 718/100 |
| 2013/0290889 A1* | 10/2013 | Bao | G06F 17/211 | 715/770 |
| 2013/0339889 A1* | 12/2013 | Bastide | G06F 3/0484 | 715/770 |
| 2014/0049695 A1* | 2/2014 | Papish | H04N 21/44204 | 348/731 |
| 2014/0082383 A1* | 3/2014 | De Cesare | G06F 1/3206 | 713/320 |
| 2014/0101583 A1* | 4/2014 | Jeong | G06F 9/451 | 715/765 |
| 2014/0143791 A1* | 5/2014 | Mark | G06F 9/485 | 719/318 |
| 2014/0189538 A1* | 7/2014 | Martens | G06F 3/0482 | 715/753 |
| 2014/0201672 A1* | 7/2014 | Borzello | G06F 3/0482 | 715/779 |
| 2014/0215372 A1* | 7/2014 | Reissman | G06F 3/0486 | 715/770 |
| 2014/0222744 A1* | 8/2014 | Maag | G06F 17/30286 | 706/46 |
| 2014/0258905 A1* | 9/2014 | Lee | G06F 3/0486 | 715/770 |
| 2014/0258914 A1* | 9/2014 | Mir | G06F 3/0484 | 715/779 |
| 2015/0186497 A1* | 7/2015 | Patton | H04W 4/21 | 707/740 |
| 2016/0034571 A1* | 2/2016 | Setayesh | G06F 17/2785 | 707/738 |
| 2016/0055164 A1* | 2/2016 | Cantarero | G06F 17/30064 | 707/740 |
| 2016/0132789 A1* | 5/2016 | Flinn | G06F 17/271 | 706/14 |
| 2016/0189049 A1* | 6/2016 | Silvestri | G06N 99/005 | 706/52 |
| 2016/0321260 A1* | 11/2016 | Owens | G06F 17/30867 | |
| 2017/0024389 A1* | 1/2017 | Liu | G06F 17/30864 | |
| 2017/0060355 A1 | 3/2017 | Padmanabhan et al. | | |
| 2017/0063962 A1* | 3/2017 | Padmanabhan | G06F 3/0482 | |
| 2017/0105235 A1* | 4/2017 | Simsek | B60R 25/01 | |

OTHER PUBLICATIONS

IBM Appendix P, list of patents and patent applications treated as related, filed herewith, 2 pages.

* cited by examiner

DATA TRANSFER TARGET APPLICATIONS THROUGH CONTENT ANALYSIS

BACKGROUND

The present invention relates generally to the field of data transfer, and more particularly to providing relevant recipient data transfer target applications through a user interface.

When users of a computing device access, create, and/or update files through application software, the users utilize a clipboard in conjunction with a clipboard manager to assist in performing the associated tasks. The clipboard is a set of functions and messages that enables application software to transfer data. As all applications have access to the clipboard, data can be easily transferred between applications and/or within an application. The clipboard manager is a computer program that adds functionality to the clipboard of an operating system. Clipboard managers enhance the basic functions of cut, copy, and paste operations with one or more features, such as multiple buffers and the ability to merge, split, and edit contents; selecting the buffer to store data from a cut or copy; selecting the buffer the paste data should be retrieved from; handling formatted text, tabular data, data objects, media content, and uniform resource locators (URLs); saving copied data to long-term storage; indexing and/or tagging clipped data; and searching saved data.

Interoperability is a property of a product or system, whose interfaces are completely understood, to work with other products or systems without restricted access or implementation. With respect to software, interoperability describes the capability of different programs to exchange data via a common set of exchange formats, to read and write the same file formats (e.g., file types), and to use the same protocols (i.e., compatible software). For example, word processor applications are compatible when the document files may be opened in either product. A file format is a standard way that information is encoded for storage in a computer file. A computer file is a resource for storing information, which is available to a computer program and other computer programs to use after the program that created the computer file has finished executing. The computer file is associated with a unique filename that includes a filename extension. A filename extension is a suffix (separated from the base filename by a dot or space) to the name of a computer file applied to indicate the encoding (e.g., file format, file type) of its contents or usage. For example, HTML documents are identified by names that end with .html (or .htm), and GIF images by .gif.

Content analysis is a research tool to determine the presence of certain words and/or concepts within texts or sets of texts. Through content analysis, meanings and relationships of such words and concepts are analyzed and quantified, allowing inferences regarding the messages within the texts, the writers, the audience, and the culture to be made. To conduct a content analysis of any text, the text is coded or broken down into manageable categories on a variety of levels (e.g., word, word sense, phrase, sentence, theme, etc.) and examined through conceptual analysis or relational analysis. Conceptual analysis establishes the existence and frequency of concepts within text. For example, a reader believes a particular author frequently writes about hunger. The reader performs a conceptual analysis to determine how many times the words "hunger," "hungry," "famished," or "starving" appear in a volume of poems. Relational analysis takes the conceptual analysis and examines the relationships among concepts in the text. Continuing the example, the relational analysis identifies the other words (or phrases) the words "hunger," "hungry," "famished," or "starving" appear next to and determines what different meanings emerge as a part of the groupings.

SUMMARY

Aspects of the present invention disclose a method, computer program product, and system for displaying applications associated with content in a clipboard. The method includes one or more computer processors receiving a selection of content to transfer to a clipboard, wherein the content is selected from a first application on a computing device. The method further includes one or more computer processors identifying one or more applications on one or more computing devices capable of processing the received selection. The method further includes one or more computer processors assigning the identified one or more applications to one or more categories. The method further includes one or more computer processors displaying one or more user interface objects representative of the one or more applications with a respective assigned category.

DETAILED DESCRIPTION

When working on a computing device, a user is able to run multiple software applications at one time, all of which have access to the clipboard, thus allowing for the transfer of data between software applications. In order to transfer cut and/or copied data from the source software application to the destination software application via the clipboard, the user must first switch to the destination software application from the source software application prior to initiating a paste. As recognized by embodiments of the present invention, when multiple software applications are running at one time, the number of destination software applications may be extensive. Embodiments of the present invention determine relevant target destination software applications based on a content analysis of the cut and/or copied selection and/or user actions. Embodiments of the present invention display the relevant target destination software applications to the user for selection, thus allowing the user to complete the paste operation efficiently.

Figure 1:
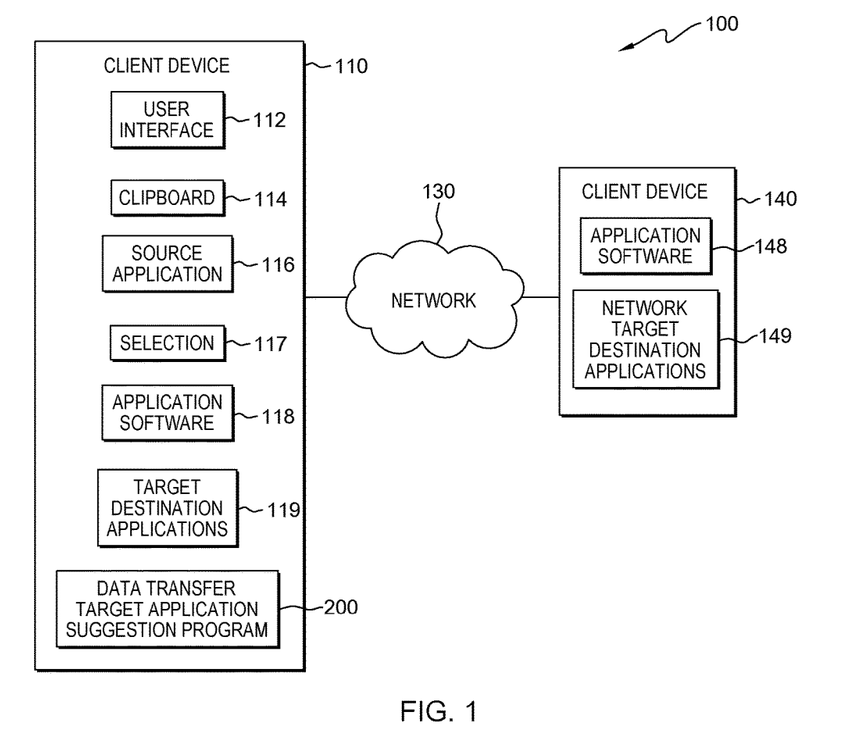
FIG. 1 is a functional block diagram illustrating a distributed data processing environment, in accordance with an embodiment of the present invention.

The present invention will now be described in detail with reference to the Figures. FIG. 1 is a functional block diagram illustrating a distributed data processing environment, generally designated 100, in accordance with one embodiment of the present invention. FIG. 1 provides only an illustration of one embodiment and does not imply any limitations with regard to the environments in which different embodiments may be implemented.

In the depicted embodiment, distributed data processing environment 100 includes client device 110 and client device 140 interconnected over network 130. Distributed data processing environment 100 may include additional computing devices, mobile computing devices, servers, computers, storage devices, or other devices not shown.

Client devices 110 and 140 may be a web server or any other electronic device or computing system capable of processing program instructions and receiving and sending data. In some embodiments, client devices 110 and 140 may be a laptop computer, a tablet computer, a netbook computer, a personal computer (PC), a desktop computer, a personal digital assistant (PDA), a smart phone, or any programmable electronic device capable of communicating with network 130. In other embodiments, client devices 110 and 140 may represent a server computing system utilizing multiple computers as a server system, such as in a cloud computing environment. In general, client devices 110 and 140 are representative of any electronic device or combination of electronic devices capable of executing machine readable program instructions as described in greater detail with regard to FIG. 4, in accordance with embodiments of the present invention. Client device 110 contains user interface 112, clipboard 114, source application 116, selection 117, application software 118, target destination applications 119, and data transfer target application suggestion program 200. Client device 140 contains application software 148 and network target destination applications 149.

User interface 112 is a program that provides an interface between a user of client device 110 and a plurality of applications that reside on client device 110 (e.g., clipboard 114, source application 116, application software 118, and target destination applications 119) and/or may be accessed over network 130 (e.g., application software 148 and network target destination applications 149). A user interface, such as user interface 112, refers to the information (e.g., graphic, text, sound) that a program presents to a user and the control sequences the user employs to control the program. A variety of types of user interfaces exist. In one embodiment, user interface 112 is a graphical user interface. A graphical user interface (GUI) is a type of interface that allows users to interact with peripheral devices (i.e., external computer hardware that provides input and output for a computing device, such as a keyboard and mouse) through graphical icons and visual indicators as opposed to text-based interfaces, typed command labels, or text navigation. The actions in GUIs are often performed through direct manipulation of the graphical elements. User interface 112 sends and receives information from clipboard 114, source application 116, application software 118, target destination applications 119, network target destination applications 149, and data transfer target application suggestion program 200.

Clipboard 114 is a set of functions and messages that enables the application software installed on client device 110 to transfer data (e.g., source application 116, application software 118, and target destination applications 119). Clipboard 114 is user driven via user interface 112 and initiates in response to clipboard commands from the user, such as cut, copy, and paste (e.g., available through edit menus, shortcut keys, mouse actions, etc.). As the content of clipboard 114 changes through the use of clipboard commands, a clipboard sequence number is incremented relating to the tracking of information placed on clipboard 114. Clipboard 114 resides on client device 110 and is accessible by user interface 112, source application 116, application software 118, target destination applications 119, network target destination applications 149, and data transfer target application suggestion program 200. In another embodiment, clipboard 114 resides on client device 140 or on another client device or server (not shown) provided clipboard 114 is accessible by user interface 112, source application 116, application software 118, target destination applications 119, network target destination applications 149, and data transfer target application suggestion program 200.

Source application 116, application software 118, target destination applications 119, application software 148, and network target destination applications 149 represent a plurality of application software that reside on client device 110 and client device 140. Application software is a program or group of programs that are designed for a user to carry out operations for a specific application (e.g., database programs, word processors, web browsers, spreadsheets, e-mail, etc.). Source application 116, application software 118, target destination applications 119, application software 148$k$ and network target destination applications 149 are capable of sending and receiving information to clipboard 114 through the utilization of copy, cut, and paste functions.

Source application 116 represents application software that a user selects information from by utilizing cut and/or copy functions of clipboard 114 via user interface 112. Application software 118 and application software 148 represent the application software available on client device 110 and client device 140, respectively, other than source application 116, which a user may select for further actions (e.g., toggle, select through task bar, access through task switcher, select from a program menu, etc.) that may or may not be capable of receiving selection 117. Target destination applications 119 and network target destination applications 149 represent application software that data transfer target application suggestion program 200 identifies within application software 118 and application software 148, respectively, as being capable of receiving cut and/or copied data (e.g., selection 117) from clipboard 114 through the paste function.

In the depicted embodiment, source application 116, application software 118, and target destination applications 119 reside on client device 110. In the depicted embodiment, application software 148 and network target destination applications 149 reside on client device 140. In other embodiments, source application 116, application software 118, target destination applications 119, application software 148, and network target destination applications 149 may reside on other devices, such as a server (not shown), provided that source application 116, application software 118, target destination applications 119, application software 148, and network target destination applications 149 are accessible to user interface 112, clipboard 114, and data transfer target application suggestion program 200.

Selection 117 is the selected data (e.g., text, image, file, etc.) from within source application 116 or memory (not shown) that is associated with a cut and/or copy, and a corresponding paste. For example, the user through user interface 112 selects or highlights text or a file for moving by some method (e.g., mouse, dragging over text, Shift+ arrow keys). The user through user interface 112 selects a cut and/or copy function (e.g., CTRL+C, CTRL+X, selection from a pull down menu, etc.). The cut command (e.g., CTRL+X) removes selection 117 from an original position and transfers selection 117 to clipboard 114, while the copy command (e.g., CTRL+C) creates a duplicate copy of selection 117 and transfers the copy of selection 117 to clipboard 114. Through the paste command (e.g., CTRL+V), selection 117 transfers from clipboard 114 to target destination applications 119, network target destination applications 149, or memory (e.g., network LAN drive, file folder). In the depicted embodiment, selection 117 resides on client device 110. In another embodiment, selection 117 resides on client device 140 or on another device or server (not shown) provided selection 117 is accessible by clipboard 114, source application 116, target destination applications 119, network target destination applications 149, and data transfer target application suggestion program 200.

Network 130 may be a local area network (LAN), a wide area network (WAN), such as the Internet, a wireless local area network (WLAN), any combination thereof, or any combination of connections and protocols that will support communications between client device 110, client device 140, and other computing devices and servers (not shown), in accordance with embodiments of the inventions. Network 130 may include wired, wireless, or fiber optic connections.

Data transfer target application suggestion program 200 is a program for determining relevant target destination applications (e.g., target destination applications 119, network target destination applications 149) from application software 118 and/or application software 148 based on a content analysis of selection 117 and data within application software 118 and/or application software 148. Data transfer target application suggestion program 200 determines which application software within application software 118 and/or application software 148 are capable of receiving a data transfer of selection 117. Data transfer target application suggestion program 200 also analyzes the content of selection 117 and the content within application software 118 and/or application software 148 that are capable of receiving the data transfer to provide target destination applications 119 and/or network target destination applications 149 for display and selection by a user through user interface 112. In the depicted embodiment, data transfer target application suggestion program 200 resides on client device 110. In another embodiment, data transfer target application suggestion program 200 resides on client device 140. In some other embodiment, data transfer target application suggestion program 200 resides on other computing devices and servers (not shown), in accordance with embodiments of the inventions provided data transfer target application suggestion program 200 has access to clipboard 114, source application 116, selection 117, application software 118, target destination applications 119, application software 148, and network target destination applications 149.

Figure 2:
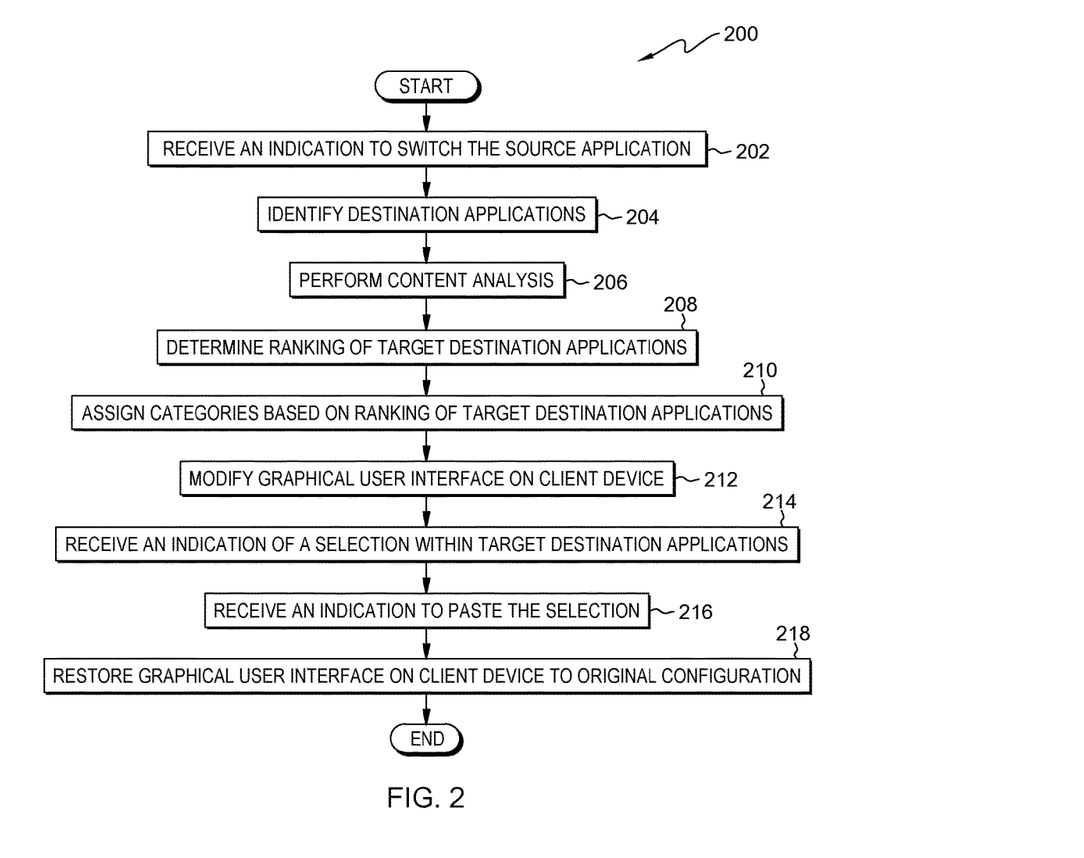
FIG. 2 is a flowchart depicting operational steps of a data transfer target application suggestion program on a client device within the data processing environment of FIG. 1 for determining target destination applications from available destination applications through content analysis, in accordance with an embodiment of the present invention.

FIG. 2 is a flowchart depicting operational steps of data transfer target application suggestion program 200, a program for determining target destination applications 119 and/or network target destination applications 149 from available application software 118 and/or application software 148 through content analysis, in accordance with an embodiment of the present invention. In the depicted embodiment, data transfer target application suggestion program 200 is running in the background on client device 110. In another embodiment, data transfer target application suggestion program 200 may be incorporated within clipboard 114 to add additional functionality. In some other embodiment, data transfer target application suggestion program 200 may be incorporated within application software (e.g., source application 116, application software 118, target destination applications 119, and network target destination applications 149).

Prior to executing data transfer target application suggestion program 200, a user of client device 110, through user interface 112, cuts and/or copies selected content (e.g., text, file, image, etc.) from within source application 116 utilizing functions associated with clipboard 114, thus creating selection 117. For example, a user highlights a text selection from within an open text file through a word processing program and selects the cut and/or copy function. The cut and/or copy function transfers selection 117, associated information regarding source application 116 (e.g., application program name and file name), and file association to clipboard 114. A file association links a file type to the corresponding instance of source application 116 installed on client device 110. A file type, also referred to as a file format or file extension, specifies how bits, which store the information of the file, are used to encode information in a digital storage medium that may be specific to a particular type of data or may be designed for storage of several types of data. For example, file types identify image files (e.g., bitmap image file (bmp), tagged image file format (TIFF), joint photographic experts group (JPG), etc.), word processing documents (e.g., documents (doc), text files (txt), portable document format (pdf), etc.), spreadsheets, multimedia files, programming language files, etc. Clipboard 114 stores selection 117, a file type, and a reference to source application 116 (e.g., location from which selection 117 originates from) for use by data transfer target application suggestion program 200 upon initiating.

In step 202, data transfer target application suggestion program 200 receives an indication to switch from source application 116 to an unspecified instance of application software 118 (application software 148) and initiates (e.g., receives an indication to display open and/or installed application software 118 other than source application 116 for selection). In one embodiment, data transfer target application suggestion program 200 receives a combination of keystrokes (e.g., ALT+Tab, Windows+Tab, ALT+ESC) from a user through user interface 112 to open a task switcher (e.g., task manager) and/or select a task bar and move between open versions of application software and files within the task switcher and/or the task bar. The task switcher is an operating system component that enables a user to view and select running tasks (e.g., open instances of application software 118 and/or application software 148) on client device 110 and client device 140, respectively. The task bar is a bar displayed on an edge of a GUI desktop that is used to launch application software 118 and/or application software 148 and/or monitor running applications (e.g., open instances of application software 118 and/or application software 148) on client device 110 and client device 140.

Figure 3A:
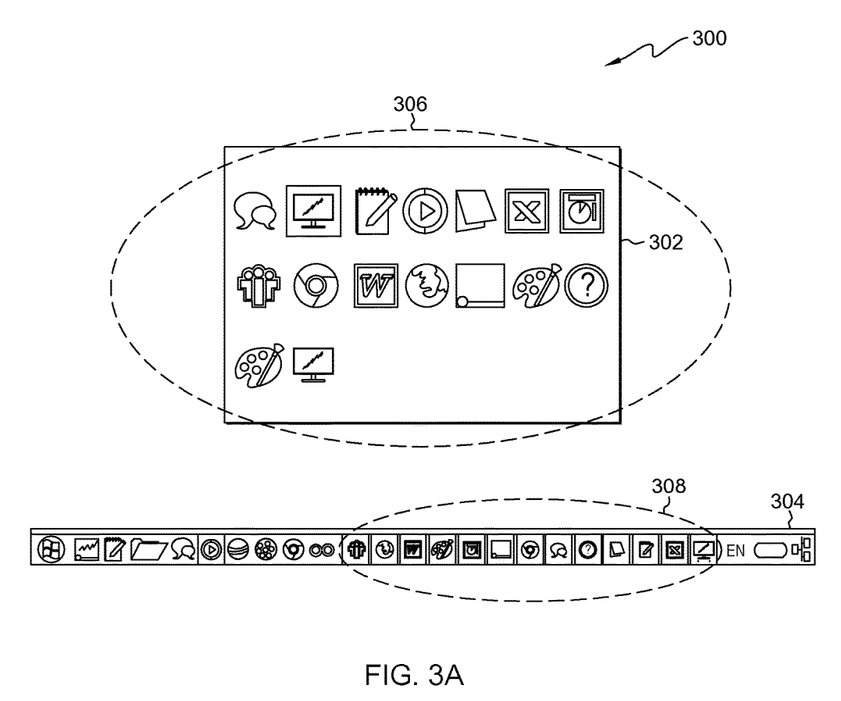
FIG. 3A illustrates an example of a user desktop showing a task switcher and task bar on the client device prior to executing the data transfer suggestion program inserted on the client device within the data processing environment of FIG. 1, in accordance with an embodiment of the present invention.

In an example embodiment, FIG. 3A depicts client device user interface display 300. In this example, data transfer target application suggestion program 200 receives the combination keystrokes of CTRL+Tab and displays task switcher 302 with icons 306 representing open instances of application software 118 (e.g., application software currently running on client device 110) to the user through the display of client device 110. Additionally, task bar 304 displays open versions of application software 118 as icons 308. Icons 308 within task bar 304 may be navigated to (e.g., selected by a user) via the combination of ALT+ESC, which advances through the open versions of application software 118 (e.g., source application 116 and open versions of application software 118), bringing the selected (e.g., active) application software to the foreground. The combination of Operating System (OS)+Tab displays an overlapping tiled version of all open instances of application software 118 and associated files on client device 110. A user advances through the open instances of application software 118 and associated files by repeating the same combination keystrokes through user interface 112. The user may change from one combination of keystrokes to another at any time by releasing the previous keystroke combination.

In another embodiment, data transfer target application suggestion program 200 receives an indication to switch an application through a menu selection within source application 116 (e.g., "Send To," "Share With," "Export," etc.). For example, a user through user interface 112 selects "File" and then "Share" from displayed options within a toolbar of source application 116 and data transfer target application suggestion program 200 initiates. In some other embodiment, data transfer target application suggestion program 200 initiates when a user, through user interface 112, drags selection 117 (e.g., selects selection 117 as an entire file). For example, the user highlights a file in a file directory (e.g., source application 116) and enters keystrokes, such as ALT+Tab, thus indicating a switch to another instance of application software 118, where the file will be "dropped" (e.g., moves selection 117 from a first location to a second location). In an alternate embodiment, data transfer target application suggestion program 200 does not receive an indication to switch and initiates in response to the creation of selection 117.

In step 204, data transfer target application suggestion program 200 identifies target destination applications 119 and/or network target destination applications 149. In one embodiment, data transfer target application suggestion program 200 identifies target destination applications 119 and/or network target destination applications 149 from open instances of application software 118 and/or application software 148. In another embodiment, data transfer target application suggestion program 200 identifies target destination applications 119 and/or network target destination applications 149 from installed instances of application software 118 and/or application software 148. For example, an instance of application software 118 and/or application software 148 is not open but is installed on client device 110 and/or client device 140 that is capable of processing selection 117. In some other embodiment, data transfer target application suggestion program 200 identifies target destination applications 119 and/or network target destination applications 149 from a combination of installed and open instances of application software 118 and/or application software 148. In one embodiment, data transfer target application suggestion program 200 does not include source application 116 within the identified target destination applications 119 as the paste function would occur within source application 116 (e.g., a user would not initiate the indication to switch to an unspecified instance of application software 118).

Data transfer target application suggestion program 200 identifies target destination applications 119 and/or network target destination applications 149 from application software 118 and/or application software 148 (e.g., open and/or installed) based on the file type associated with selection 117. Data transfer target application suggestion program 200 accesses clipboard 114 and retrieves selection 117, which is associated with the file type and reference to source application 116. Data transfer target application suggestion program 200 utilizes the file type associated with selection 117 to identify instances of application software 118 and/or application software 148 installed on client device 110 and/or client device 140 that are capable of receiving selection 117 (e.g., file type is compatible with application software 118 and/or application software 148). For example, a word processing application is capable of processing multiple file types, such as .txt, .rtf, .doc, .pdf, .html, .docx, .xml, etc. Data transfer target application suggestion program 200 identifies the instances of application software 118 capable of recognizing the file type associated with selection 117 as target destination applications 119 and excludes instances of application software 118 not capable of recognizing the file type associated with selection 117 from further processing. Additionally, data transfer target application suggestion program 200, when connected to client device 140 over network 130, identifies the instances of application software 148 capable of recognizing the file type associated with selection 117 as network target destination applications 149 and excludes instances of application software 148 not capable of recognizing the file type associated with selection 117 from further processing.

For example, selection 117 includes a line of copied text from source application 116 with an associated file type of ".txt" (e.g., plain text). Data transfer target application suggestion program 200 identifies that application software 118 includes applications for; a notepad, a web browser, a word processor, a spreadsheet, and a media player. Data transfer target application suggestion program 200 determines the notepad application, web browser application, word processing application, and spreadsheet application are capable of receiving selection 117 (e.g., recognize file type associated with a .txt file type). However, data transfer target application suggestion program 200 determines the media player is unable to recognize the file type of .txt (e.g., media player recognizes file types, such as .mp3, .wma, .wav, .wmv, .avi, etc.). Therefore, data transfer target application suggestion program 200 identifies the notepad, web browser, word processor, and spreadsheet as target destination applications 119 and excludes the media player from further processing.

In step 206, data transfer target application suggestion program 200 performs a content analysis. Data transfer target application suggestion program 200 performs a content analysis on selection 117. In addition, data transfer target application suggestion program 200 performs a content analysis on data within target destination applications 119 and/or network target destination applications 149. Content analysis is a technique that is based on an assumption that words and phrases with higher frequencies reflect more important aspects of a communication, but additionally takes into account the specific context of the communication to remove uncertainties. The content analysis may be broken into three categories: inferences regarding antecedents of a communication, inferences pertaining to characteristics of the communication, and inferences about the effects of the communication. Therefore, content analysis encompasses a set of manual and/or computer assisted techniques for contextualized interpretations of information produced through communications resulting in the analysis and quantification of meanings and relationships of words and concepts, thus allowing valid inferences to be made. In one embodiment, data transfer target application suggestion program 200 utilizes predefined settings (e.g., amount of content exceeds a value, latest correspondence, content containing keywords, etc.) to perform the content analysis. In another embodiment, data transfer target application suggestion program 200 receives changes to the predefined settings from a user via user interface 112 and utilizes the user updated predefined settings to perform the content analysis.

In one embodiment, data transfer target application suggestion program 200 analyzes the entirety of the content available in selection 117 and/or target destination applications 119 and/or network target destination applications 149 based on the predefined settings. In another embodiment, data transfer target application suggestion program 200 analyzes a portion (e.g., paragraph, sentence, table, questions, etc.) of the content available in selection 117 and/or target destination applications 119 and/or network target destination applications 149 based on predefined settings. For example, within an instant messaging application, a correspondence between two users includes one hundred responses over the course of a day; however, data transfer target application suggestion program 200 analyzes messages received within the last ten minutes (e.g., more likely to include data relevant to the content analysis).

In some other embodiment, data transfer target application suggestion program 200 analyzes a combination of the entirety and/or portions of the content within selection 117 and/or target destination applications 119 and/or network target destination applications 149 based on the predefined settings. For example, selection 117 includes a single sentence of text, and target destination applications 119 is an open word processing document with three hundred pages of text. Data transfer target application suggestion program 200 performs a content analysis on the entirety of selection 117 but performs the content analysis on portions of target destination applications 119 based on the location of the cursor within the open word processing document (e.g., previous page, current page, and following page with respect to the cursor). Data transfer target application suggestion program 200 identifies the properties associated with selection 117 and target destination applications 119 and/or network target destination applications 149 (e.g., frequency of most used words, structures of communication content, categorize content by meaning, etc.) for further use.

In step 208, data transfer target application suggestion program 200 determines a ranking of target destination applications 119 and/or network target destination applications 149 (e.g., ranks individual instances of target destination applications 119 and/or network target destination applications 149). In one embodiment, data transfer target application suggestion program 200 determines the ranking of target destination applications 119 based on correlations between selection 117 and target destination applications 119 from the content analysis. For example, data transfer target application suggestion program 200, through the content analysis (e.g., of step 206), identifies that selection 117 includes an Internet Protocol (IP) address. Data transfer target application suggestion program 200 determines an open web browser, a closed file transfer program (FTP), and an open command prompt are capable of receiving selection 117. Through further content analysis of target destination applications 119, data transfer target application suggestion program 200 identifies that the command prompt window includes the word "telnet," which provides access to a command-line interface on a remote host through a session layer protocol but requires an IP address to establish a connection. Data transfer target application suggestion program 200 correlates the IP address of selection 117 with the telnet command (e.g., recognizes to execute the telnet command, an IP address needs to be included with the command) and ranks the command prompt window that includes a correlation within the content analysis first, the open web browser without a correlation within the content analysis second, and the unopened FTP application without a correlation within the content analysis third.

In another embodiment, data transfer target application suggestion program 200 determines a ranking of target destination applications 119 and/or network target destination applications 149 based on an analysis of the history of clipboard 114 (e.g., frequency of occurrence, patterns, most recent actions, etc.). For example, clipboard 114 includes one cut and paste action between a web browser and messaging application, a combination of twenty cut, copy and paste actions between the web browser and a word processing application, and five copy and paste actions between the web browser and a spreadsheet program. Based on the frequency of occurrence, data transfer target application suggestion program 200 ranks target destination applications 119 and/or network target destination applications 149 in ascending order (e.g., word processing application first, the spreadsheet program second, and the messaging application third). In another example, data transfer target application suggestion program 200 identifies a repeating pattern within clipboard 114 of: copy a web address from a spreadsheet, paste the web address within a web browser, then copy text from the web browser, and paste to a word processing document. Data transfer target application suggestion program 200 identifies the last action associated with clipboard 114 as the paste from the web browser. Data transfer target application suggestion program 200 applies the identified pattern and determines the next action to be the paste to the word processing document. Data transfer target application suggestion program 200, therefore, ranks the word processing document highest.

In some other embodiment, data transfer target application suggestion program 200 determines the ranking of target destination applications 119 and/or network target destination applications 149 based on status. For example, data transfer target application suggestion program 200 ranks open instances of target destination applications 119 higher than unopened instances of network target destination applications 149. In some other embodiment, data transfer target application suggestion program 200 determines a ranking through weighted scoring. Weighted scoring is a form of multi-attribute or multi-criterion analysis in which weights are applied to individual attributes to reflect importance or the individual attributes that are then combined for an overall performance and comparison. For example, data transfer target application suggestion program 200 applies a weighted scoring method to the results of the content analysis, history of clipboard 114, and application status for each individual instance of target destination applications 119 and/or network target destination applications 149 and calculates weighted scores. Data transfer target application suggestion program 200 utilizes the weighted scores associates with the individual instances of target destination applications 119 and/or network target destination applications 149 to form a ranking (e.g., highest to lowest, lowest to highest, etc.).

In step 210, data transfer target application suggestion program 200 assigns categories based on the ranking of target destination applications 119 and/or network target destination applications 149. Data transfer target application suggestion program 200 divides the ranking into one or more categories (e.g., "most likely," "likely," "least likely," "high," "medium," "low," etc.) based on predefined criteria (e.g., percentage of overall weighted scores, content analysis results, open/closed application status, rank, etc.). For example, data transfer target application suggestion program 200 assigns instances of target destination applications 119 and/or network target destination applications 149 with weighted scores greater than or equal to seventy-five percent are "most likely," weighted scores less than seventy-five percent but greater than or equal to fifty percent are "likely," and weighted scores below fifty percent are "least likely." In another example, data transfer target application suggestion program 200 assigns open instances of target destination applications 119 and/or network target destination applications 149 with correlations within the content analysis as "most likely" category, open instances of target destination applications 119 and/or network target destination applications 149 without a correlation within the content analysis as "likely," and unopened instances of target destination applications 119 and/or network target destination applications 149 without a correlation within the content analysis as "least likely."

Figure 3B:
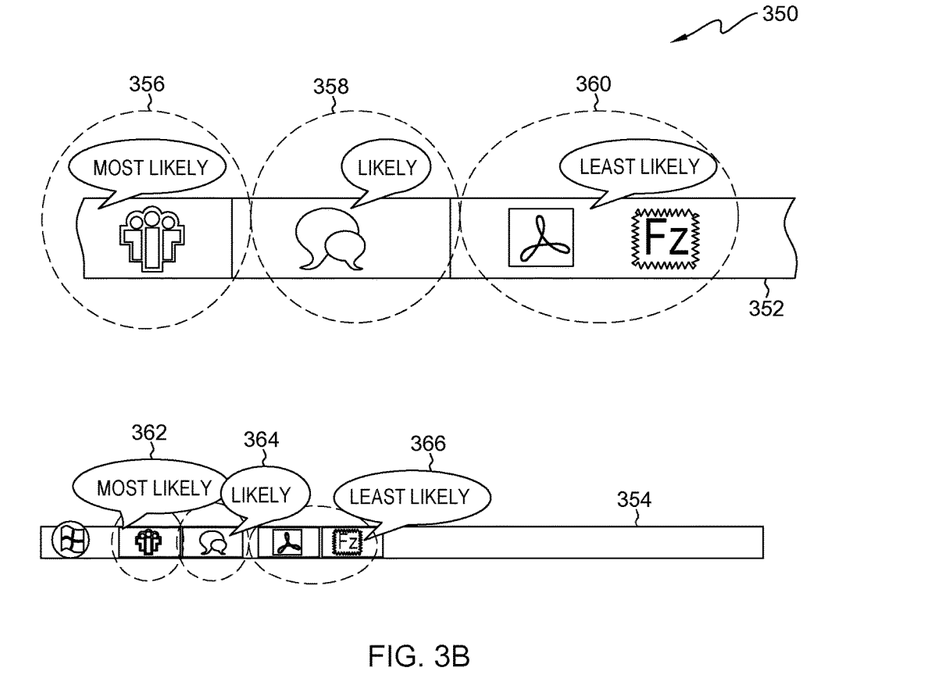
FIG. 3B illustrates an example of the user desktop showing the task switcher and the task bar on the client device after executing the data transfer suggestion program inserted on the client device within the data processing environment of FIG. 1, in accordance with an embodiment of the present invention.

In step 212, data transfer target application suggestion program 200 modifies the graphical user interface on client device 110. In one embodiment, data transfer target application suggestion program 200 modifies the task switcher to display only target destination applications 119 and/or network target destination applications 149 within categories (e.g., no longer displays all instances of application software 118). In another embodiment, data transfer target application suggestion program 200 modifies the task bar to display only target destination applications 119 and/or network target destination applications 149 within categories. In some other embodiment, data transfer target application suggestion program 200 modifies the task switcher and the task bar to display only target destination applications 119 and/or network target destination applications 149 within categories. For example, as depicted in FIG. 3A, task switcher 302 and task bar 304 display sixteen open instances of application software 118 as icons 306 and icons 308. However, as depicted in FIG. 3B, modified client device user interface display 350, data transfer target application suggestion program 200 reduces the sixteen open instances of application software 118 (e.g., icons 306, icons 308) within task switcher 302 and task bar 304 to four instances of target destination applications 119 within task switcher 352 and task bar 354 that are capable of receiving selection 117. Additionally, data transfer target application suggestion program 200 divides and displays the four instances of target destination applications 119 within three categories, category 356 (e.g., "most likely"), category 358 (e.g., "likely"), and category 360 (e.g., least likely) within task switcher 352, and category 362 (e.g., "most likely"), category 364 (e.g., "likely"), and category 366 (e.g., least likely) within task bar 354. Data transfer target application suggestion program 200, therefore, identifies a preferred selection order associated with the four instances of target destination applications 119 in both task switcher 352 and task bar 354.

In another embodiment, data transfer target application suggestion program 200 modifies the selections within a pull-down menu to display only target destination applications 119 and/or network target destination applications 149 within categories. For example, a user takes a picture and selects share. Initially, an image software application provides options to share the file through two e-mail applications, two social media sites, a messaging program, an online image printing store, and an FTP program. Data transfer target application suggestion program 200 reduces the seven instances of application software 118 to three instances of target destination applications 119, the open e-mail application, the social media site, and the online image printing store. In one embodiment, data transfer target application suggestion program 200 divides and displays the three instances into categories. In another embodiment, data transfer target application suggestion program 200 lists the three instances of target destination applications 119 in ranked order (e.g., highest to lowest).

In step 214, data transfer target application suggestion program 200 receives an indication of a selection identifying an instance of target destination applications 119 and/or network target destination applications 149. In one embodiment, data transfer target application suggestion program 200 receives a selection through the task switcher when the user toggles to an instance of target destination applications 119 and releases the ALT+Tab (e.g., ALT+ESC, Windows+Tab, etc.). Upon registering the release of the ALT+Tab, client device 110 displays the selected instance of target destination applications 119. In another embodiment, data transfer target application suggestion program 200 receives a selection of target destination applications 119 through a peripheral device. For example, a user moves the mouse resulting in the placement of the associated cursor over an instance of target destination applications 119 and depresses the left mouse button indicating a selection, which opens the selected instance of target destination applications 119. In one embodiment the selected instance of target destination applications 119 is open, and data transfer target application suggestion program 200 switches from source application 116 to the open selected instance of target destination applications 119. In another embodiment, the selected instance of target destination applications 119 is not open. Data transfer target application suggestion program 200 opens the selected instance of target destination applications 119. Data transfer target application suggestion program 200 then switches from source application 116 to the now open selected instance of target destination applications 119. After completion of the selection, the user of client device 110 through user interface 112 navigates through the selected instance of target destination applications 119 to identify a location to paste selection 117.

In another embodiment, data transfer target application suggestion program 200 again receives a combination of keystrokes from a user through user interface 112 to open a task switcher and/or select a task bar and move between open versions of application software 118 and files within the task switcher and/or the task bar. Data transfer target application suggestion program 200 again displays the modified graphical user interface (e.g., task switcher) with target destination applications 119. Data transfer target application suggestion program 200 receives a second selection identifying a second instance of target destination applications 119 and/or network target destination applications 149 without additional processing (e.g., utilizes previous results). For example, the user is working with two files within a spreadsheet program. The user incorrectly selects the first file which does not include the location for selection 117 and does not initiate the paste function. The user reselects ALT+Tab in order to make another selection, and data transfer target application suggestion program 200 displays target destination applications 119.

In step 216, data transfer target application suggestion program 200 receives an indication to paste selection 117 within the selected instance of target destination applications 119. Data transfer target application suggestion program 200 receives a paste function from the user through user interface 112 (e.g., depresses CTRL+V, selects paste from a pull-down menu, etc.). In response to receipt of the paste function, clipboard 114 transfers selection 117 into the selected instance of target destination applications 119.

In step 218, data transfer target application suggestion program 200 restores the graphical user interface on client device 110 to the originally displayed configuration. Data transfer target application suggestion program 200 registers the paste function as a completion, and data transfer target application suggestion program 200 completes. At completion, data transfer target application suggestion program 200 removes the changes to the icons displayed within the task switcher and task bar. For example, task bar 354 reverts from displaying target destination applications 119 with assigned categories to the originally displayed configuration of all open instances of application software 118 as depicted by task bar 304. Additionally, the user again selects ALT+Tab without selection 117 (e.g., no data has been cut and/or copied), and the task switcher displays all open instances of application software 118 instead of target destination applications 119 with associated categories (e.g., task switcher 352 restores and displays task switcher 302).

Figure 4:
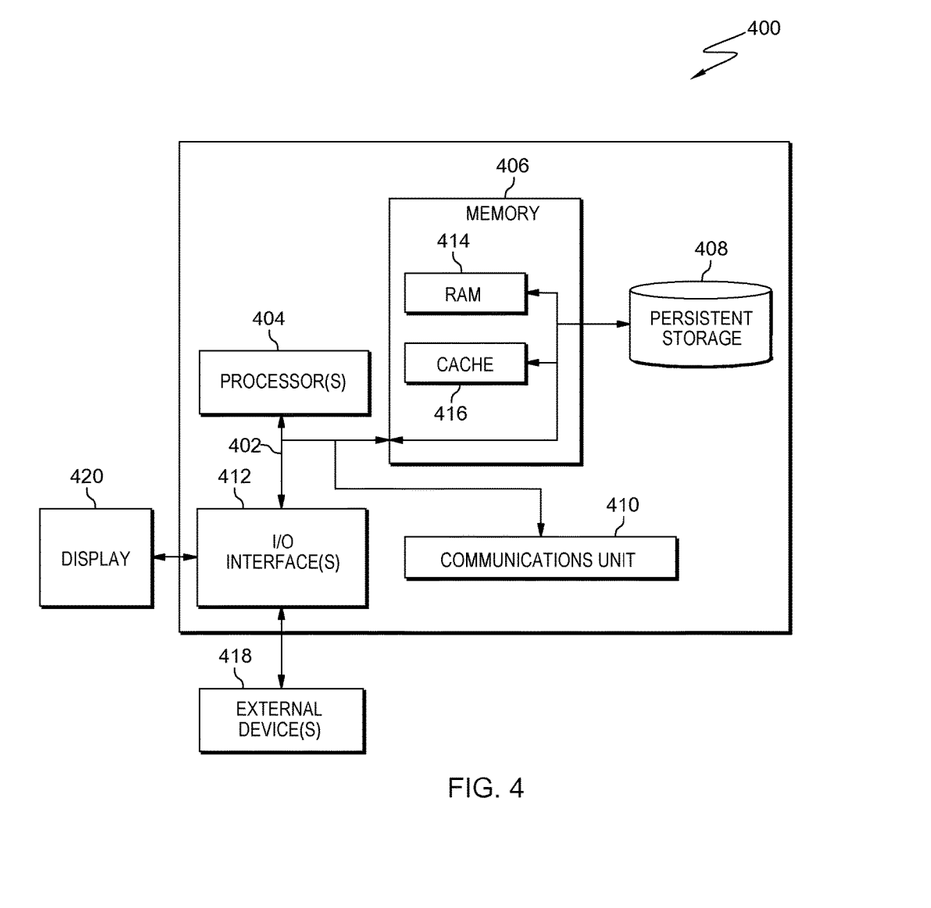
FIG. 4 is a block diagram of components of the client device executing the data transfer target application suggestion program, in accordance with an embodiment of the present invention.

FIG. 4 depicts a block diagram of components of computer 400, in accordance with an illustrative embodiment of the present invention. It should be appreciated that FIG. 4 provides only an illustration of one implementation and does not imply any limitations with regard to the environments in which different embodiments may be implemented. Many modifications to the depicted environment may be made.

Computer 400 includes communications fabric 402, which provides communications between cache 416, memory 406, persistent storage 408, communications unit 410, and input/output (I/O) interface(s) 412. Communications fabric 402 can be implemented with any architecture designed for passing data and/or control information between processors (such as microprocessors, communications and network processors, etc.), system memory, peripheral devices, and any other hardware components within a system. For example, communications fabric 402 can be implemented with one or more buses or a crossbar switch.

Memory 406 and persistent storage 408 are computer readable storage media. In this embodiment, memory 406 includes random access memory (RAM) 414. In general, memory 406 can include any suitable volatile or non-volatile computer readable storage media. Cache 416 is a fast memory that enhances the performance of computer processor(s) 404 by holding recently accessed data, and data near accessed data, from memory 406.

User interface 112, clipboard 114, source application 116, selection 117, application software 118, target destination applications 119, application software 148, network target destination applications 149, and data transfer target application suggestion program 200 may be stored in persistent storage 408 and in memory 406 for execution and/or access by one or more of the respective computer processor(s) 404 via cache 416. In an embodiment, persistent storage 408 includes a magnetic hard disk drive. Alternatively, or in addition to a magnetic hard disk drive, persistent storage 408 can include a solid-state hard drive, a semiconductor storage device, a read-only memory (ROM), an erasable programmable read-only memory (EPROM), a flash memory, or any other computer readable storage media that is capable of storing program instructions or digital information.

The media used by persistent storage 408 may also be removable. For example, a removable hard drive may be used for persistent storage 408. Other examples include optical and magnetic disks, thumb drives, and smart cards that are inserted into a drive for transfer onto another computer readable storage medium that is also part of persistent storage 408.

Communications unit 410, in these examples, provides for communications with other data processing systems or devices. In these examples, communications unit 410 includes one or more network interface cards. Communications unit 410 may provide communications through the use of either or both physical and wireless communications links. User interface 112, clipboard 114, source application 116, selection 117, application software 118, target destination applications 119, application software 148, network target destination applications 149, and data transfer target application suggestion program 200 may be downloaded to persistent storage 408 through communications unit 410.

I/O interface(s) 412 allows for input and output of data with other devices that may be connected to computer 400. For example, I/O interface(s) 412 may provide a connection to external device(s) 418, such as a keyboard, a keypad, a touch screen, and/or some other suitable input device. External device(s) 418 can also include portable computer readable storage media such as, for example, thumb drives, portable optical or magnetic disks, and memory cards. Software and data used to practice embodiments of the present invention, e.g., user interface 112, clipboard 114, source application 116, selection 117, application software 118, target destination applications 119, application software 148, network target destination applications 149, and data transfer target application suggestion program 200, can be stored on such portable computer readable storage media and can be loaded onto persistent storage 408 via I/O interface(s) 412. I/O interface(s) 412 also connect to a display 420.

Display 420 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer program product for displaying applications associated with content in a clipboard, the computer program product comprising:
one or more computer readable storage media and program instructions stored on the one or more computer readable storage media, the program instructions comprising:
program instructions to receive a selection of content to transfer to a clipboard, wherein the content is selected from a first application executing on a computing device;
program instructions to identify one or more applications on one or more computing devices to process the received selection;
program instructions to perform a content analysis of the received selection based on predefined settings, wherein the predefined settings include an amount of textual content associated with the received selection that exceeds a threshold value and textual content that includes keywords;

program instructions to perform a content analysis of a portion of data within the identified one or more applications based on a cursor location;

program instructions to calculate a weighted score of the one or more applications based on correlations, a pattern, and a status;

program instructions to determine a ranking of the one or more applications based on the calculated weighted score;

program instructions to divide the determined ranking into the one or more categories based on predefined criteria with respect to the calculated weighted score of the one or more applications, wherein the predetermined criteria includes percentages of the calculated weighted score, the correlations, the performed content analysis, the status, and the determined rank;

program instructions to assign the identified one or more applications to one or more categories based on the performed content analysis of the received selection the performed content analysis of the portion of data, and the divided determined ranking, wherein the one or more categories include: a most likely category, a likely category, and a least likely category; and program instructions to display one or more user interface objects representative of the one or more applications with a respective assigned category within a task switcher.

2. The computer program product of claim 1, wherein to identify one or more applications on one or more computing devices to process the received selection, further comprises one or more of the following program instructions, stored on the one or more computer readable storage media, to:

receive an indication to switch from the first application to a second application wherein the received indication includes:

receive a selection from within a menu of the first application that indicates the second application, wherein the selection from within the menu is one selection selected from a group consisting of: a share option and an export option.

3. The computer program product of claim 1, wherein identifying one or more applications on one or more computing devices capable of processing the received selection further comprises program instructions, stored on the one or more computer readable storage media, to:

identify a file type associated with the received selection; and determine one or more applications capable of processing the identified file type.

4. The computer program product of claim 1, wherein assigning the identified one or more applications to the one or more categories based on the performed content analysis of the received selection and the performed content analysis of the portion of data further comprises program instructions, stored on the one or more computer readable storage media, to:

identify correlations between the performed content analysis of the received selection and the performed content analysis of the portion of data within the identified one or more applications;

determine a pattern of user actions in a clipboard based on an analysis of a history of user actions associated with the clipboard that includes a frequency of occurrence, determination of a repeating pattern, and recent actions; and determine a status of the one or more applications, wherein the status of each of the one or more applications includes open and closed, wherein the open identifies application software that is currently running and the closed identified application software that is installed and inactive.

5. The computer program product of claim 1, wherein displaying the one or more user interface objects representative of the one or more applications with a respective assigned category within the task switcher further comprises program instructions, stored on the one or more computer readable storage media, to:

update the task switcher from an original configuration that displays all open instances of application software to display the one or more user interface objects representative of the one or more applications with a respective assigned category.

6. The computer program product of claim 1, further comprises program instructions, stored on the one or more computer readable storage media, to:

update a task bar from an original configuration that displays icons associated with all the open instances of application software to display a reduced number of icons associated with the one or more user interface objects representative of the one or more applications with a respective assigned category.

7. The computer program product of claim 1, further comprises program instructions, stored on the one or more computer readable storage media, to:

receive a selection of a user interface object associated with a second application from the displayed one or more user interface objects representative of the one or more applications with the respective assigned category from within one of: the task switcher and a task bar;

switch from the first application to the second application based on the received selection of the user interface object associated with the second application;

receive an indication to paste the received selection within the second application; and restore one or more of: the task switcher and the task bar, to an original configuration.

8. The computer program product of claim 1, wherein the portion of data is selected based on a time period within the identified one or more applications, wherein the time period is based on a time of receipt associated with a correspondence.

9. A computer system for displaying applications associated with content in a clipboard, the computer system comprising:

one or more computer processors, one or more computer readable storage media, and program instructions stored on the computer readable storage media for execution by at least one of the one or more processors, the program instructions comprising:

program instructions to receive a selection of content to transfer to a clipboard, wherein the content is selected from a first application executing on a computing device;

program instructions to identify one or more applications on one or more computing devices to process the received selection;

program instructions to perform a content analysis of the received selection based on predefined settings, wherein the predefined settings include an amount of textual content associated with the received selection that exceeds a threshold value and textual content that includes keywords;

program instructions to perform a content analysis of a portion of data within the identified one or more applications based on a cursor location;

program instructions to calculate a weighted score of the one or more applications based on correlations, a pattern, and a status;

program instructions to determine a ranking of the one or more applications based on the calculated weighted score;

program instructions to divide the determined ranking into the one or more categories based on predefined criteria with respect to the calculated weighted score of the one or more applications, wherein the predetermined criteria includes percentages of the calculated weighted score, the correlations, the performed content analysis, the status, and the determined rank;

program instructions to assign the identified one or more applications to one or more categories based on the performed content analysis of the received selection the performed content analysis of the portion of data, and the divided determined ranking, wherein the one or more categories include: a most likely category, a likely category, and a least likely category; and program instructions to display one or more user interface objects representative of the one or more applications with a respective assigned category within a task switcher.

10. The computer system of claim 9, to identify one or more applications on one or more computing devices to process the received selection, further comprises one or more of the following program instructions, stored on the one or more computer readable storage media, to:

receive an indication to switch from the first application to a second application wherein the received indication includes:

receive a selection from within a menu of the first application that indicates the second application, wherein the selection from within the menu is one selection selected from a group consisting of: a share option and an export option.

11. The computer system of claim 9, wherein identifying one or more applications on one or more computing devices capable of processing the received selection further comprises program instructions, stored on the one or more computer readable storage media, to:

identify a file type associated with the received selection; and determine one or more applications capable of processing the identified file type.

12. The computer system of claim 9, wherein assigning the identified one or more applications to the one or more categories based on the performed content analysis of the received selection and the performed content analysis of the portion of data further comprises program instructions, stored on the one or more computer readable storage media, to:

identify correlations between the performed content analysis of the received selection and the performed content analysis of the portion of data within the identified one or more applications;

determine a pattern of user actions in a clipboard based on an analysis of a history of user actions associated with the clipboard that includes a frequency of occurrence, determination of a repeating pattern, and recent actions; and determine a status of the one or more applications, wherein the status of each of the one or more applications includes open and closed, wherein the open identifies application software that is currently running and the closed identified application software that is installed and inactive.

13. The computer system of claim 9, wherein displaying the one or more user interface objects representative of the one or more applications with a respective assigned category within the task switcher further comprises program instructions, stored on the one or more computer readable storage media, to:

update the task switcher from an original configuration that displays all open instances of application software to display the one or more user interface objects representative of the one or more applications with a respective assigned category.

14. The computer system of claim 9, further comprises program instructions, stored on the one or more computer readable storage media, to:

update a task bar from an original configuration that displays icons associated with all open instances of application software to display a reduced number of icons associated with the one or more user interface objects representative of the one or more applications with a respective assigned category.

15. The computer system of claim 9, further comprises program instructions, stored on the one or more computer readable storage media, to:

receive a selection of a user interface object associated with a second application from the displayed one or more user interface objects representative of the one or more applications with the respective assigned category from within one of: the task switcher and a task bar;

switch from the first application to the second application based on the received selection of the user interface object associated with the second application;

receive an indication to paste the received selection within the second application; and restore one or more of: the task switcher and the task bar, to an original configuration.

16. The computer system of claim 9, wherein the portion of data is selected based on a time period within the identified one or more applications, wherein the time period is based on a time of receipt associated with a correspondence.

* * * * *